United States Patent
Amisano et al.

[11] Patent Number: 6,151,544
[45] Date of Patent: Nov. 21, 2000

[54] METHOD AND DEVICE FOR CONTROLLING THE CLUTCH OF A VEHICLE

[75] Inventors: Fabrizio Amisano, Turin; Massimo Seminara, Novara, both of Italy

[73] Assignee: Magneti Marelli S.p.A., Milan, Italy

[21] Appl. No.: 09/018,300

[22] Filed: Feb. 4, 1998

[30] Foreign Application Priority Data

Feb. 4, 1997 [IT] Italy ................................. TO97A0086

[51] Int. Cl.$^7$ ........................... G06F 17/00; B60K 41/02
[52] U.S. Cl. ............................... 701/67; 701/68; 701/66; 477/174; 477/180; 477/176; 192/3.3; 192/103 F
[58] Field of Search ................................. 701/67, 68, 51, 701/66; 477/63, 176, 169, 62, 118, 180, 174, 175, 179; 192/70.23, 3.3, 3.31, 3.58, 103 F, 103 R

[56] References Cited

U.S. PATENT DOCUMENTS

| | | | |
|---|---|---|---|
| 4,503,734 | 3/1985 | Acker ......................................... | 701/67 |
| 4,561,530 | 12/1985 | Parsons et al. ......................... | 477/176 |
| 4,681,199 | 7/1987 | Maucher et al. ...................... | 192/70.23 |
| 5,573,473 | 11/1996 | Asayama et al. ......................... | 477/63 |
| 5,679,099 | 10/1997 | Kato et al. ............................... | 477/176 |

FOREIGN PATENT DOCUMENTS 0101220A 2/1984 European Pat. Off. .

OTHER PUBLICATIONS

European Search Report dated May 13, 1998 Appln. No. 98101840.1—2315—.

*Primary Examiner*—Jacques H. Louis-Jacques
*Attorney, Agent, or Firm*—Hall, Priddy, Myers & Vande Sande

[57] ABSTRACT

The control method comprises the stages of: generating a reference torque signal, the instantaneous value of which indicates the desired value of the torque transmitted through the clutch; generating a reaction signal correlated to the position of an actuating member of the clutch, the position of the actuating member being comprised between a first end-of-travel position in which the clutch is completely open and a second end-of-travel position in which the clutch is completely closed; generating an estimated torque signal, the instantaneous value of which indicates the estimated value of the torque transmitted through the clutch, on the basis of the reaction signal and a transmissibility function of the clutch; and generating a control signal for adjusting the position of the clutch as a function of the reference torque signal and the estimated torque signal. The method comprises, moreover, the stage of updating the transmissibility function of the clutch during operation of the clutch (for example at acceleration of the vehicle) so as to adapt it to the variations, over time, in the mechanical characteristics of the clutch itself.

24 Claims, 2 Drawing Sheets

METHOD AND DEVICE FOR CONTROLLING THE CLUTCH OF A VEHICLE

BACKGROUND OF THE INVENTION

The present invention relates to a method and a device for controlling the clutch of a vehicle.

As is known, during the operation of opening and closing of the clutch, for example during gear-changing or acceleration manoeuvres of the vehicle, the torque value transmitted by the engine to the drive wheels via the clutch itself depends mainly on the load acting on the clutch disc, the value of which depends on the position of the actuating lever of the clutch itself.

The clutch actuating operations are normally performed manually by the driver of the vehicle, who adjusts the approach position of the clutch so as to obtain a substantially gradual transfer of the torque through the clutch itself and therefore a comfortable travel progression of the vehicle.

It is also known to perform the clutch actuating operations in an entirely automatic manner by means of electronic control devices which have the purpose of adjusting, during operation of the clutch, the position of the actuating lever of the clutch itself depending on a plurality of input signals.

An example of embodiment of a control device of the electronic type is shown in FIG. 1.

According to that shown in this figure, the control device, denoted in its entirety by 1, operates, by means of an actuator 2 driven by a solenoid valve 3, an actuating lever 4 (of the known type and shown schematically) of a clutch 5 arranged between the output shaft 6a of an engine 6 (shown schematically) and an input shaft 7a of a gearbox 7 (shown schematically).

In particular, by means of the actuating lever 4 it is possible to vary in a known manner the load acting on a disc (not shown) of the clutch 5 and therefore the torque transmitted through the clutch 5 itself.

The control device 1 comprises a signal generator circuit 8 receiving at its input a plurality of information signals $S_{INF}$ and generating at its output, on the basis of the input signals, a reference torque signal $C_{RIF}$, the instantaneous value of which indicates the desired value of the torque transmitted via the clutch 5.

In particular, the information signals $S_{INF}$ on the basis of which the reference torque signal $C_{RIF}$ is generated, are signals correlated to parameters of an operational nature and relating to the status of the vehicle, namely parameters such as, for example, the position of the accelerator pedal, the angular velocity of the engine 6, the angular velocity of the clutch 5, the position of the brake pedal, etc.

The control device 1 comprises, moreover, an adder circuit 9 receiving at its input the reference torque signal $C_{RIF}$ and an estimated torque signal $C_{ST}$, the instantaneous value of which indicates the estimated value of the torque transmitted through the clutch 5, and generating at its output an error signal $C_E$ resulting from the difference between the reference torque signal $C_{RIF}$ and the estimated torque signal $C_{ST}$.

The control device 1 comprises, moreover, a control circuit 10 of the known type, for example of the proportional-integral type PI, receiving at its input the error signal $C_E$ and generating at its output a control signal $C_M$ used for operating the solenoid valve 3 and therefore for controlling the actuator 2 and adjusting the position of the actuating lever 4.

The control device 1 comprises, moreover, a position sensor 11 coupled to the actuator 2 and generating at its output a reaction signal X correlated to the operational position of the actuator 2 (and hence to the position of the actuating lever 4 of the clutch 5) and a memory 12 receiving at its input the reaction signal X and generating at its output the aforementioned estimated torque signal $C_{ST}$.

In particular, the memory 12 has stored in it a table containing a plurality of numerical values defining a transmissibility function F(X) of the clutch 5, which enables a corresponding value of the torque transmitted through the clutch 5 itself to be estimated for each of the positions assumed by the actuating lever 4 of the clutch 5.

In detail, the transmissibility function F(X) of the clutch 5 defines a one-to-one association between each of the instantaneous values $x_i$ of the incoming reaction signal X and a corresponding instantaneous value, indicated by $C_{FRIZ\_OLD}$, of the outgoing estimated torque signal $C_{ST}$; therefore a plurality of pairs of values are stored in the memory 12, each pair relates to a respective position assumed by the actuating lever 4 and comprises an instantaneous value $x_i$ of the reaction signal X and a corresponding instantaneous value $C_{FRIZ\_OLD}$ of the estimated torque signal $C_{ST}$.

During use, the control device 1 operates in the form of a closed loop following the reference torque signal $C_{RIF}$ generated by the signal generator circuit 8 and operating, via the solenoid valve 3, the actuator 2 of the actuating lever 4 of the clutch 5. In particular, on the basis of the position of the actuator 2, the memory 12 generates at its output the estimated torque signal $C_{ST}$ supplied to the adder circuit 9 so that the torque transmitted to the drive wheels of the vehicle is as far as possible equal to the desired torque, in order to obtain a substantially gradual transfer of the torque through the clutch 5 and therefore a comfortable travel progression of the vehicle.

The progression, over time, of the torque transmitted through the clutch 5 during operation of the clutch 5 itself depends substantially on the progression of the aforementioned transmissibility function F(X), which is in turn dependent upon the mechanical characteristics of the clutch 5.

The mechanical characteristics of the clutch 5, however, are subject to changes during the life of the clutch 5 itself on account of inevitable phenomena of wear and variations in the operating temperature of the clutch 5.

Therefore, when the transmissibility function F(X) no longer reflects the actual mechanical characteristics of the clutch 5, electronic control of the torque transmitted through the clutch 5 becomes unreliable and therefore results in a worsening in the performance of the vehicle during the gear-changing and acceleration manoeuvres.

SUMMARY OF THE INVENTION

The object of the present invention is that of providing a method and a device for controlling the clutch of a vehicle, which enable the problems of electronic control devices of the known type to be resolved in a simple and economical manner.

According to the present invention, a method for controlling the clutch of a vehicle is provided, comprising the stages of:

generating a reference torque signal representing at least one desired value of the torque transmitted through the said clutch;

generating a reaction signal correlated to the position of an actuating member of the said clutch; the said position of the actuating member being comprised between a first end-of-travel position in which said clutch is completely open and a second end-of-travel position in which said clutch is completely closed;

generating an estimated torque signal representing at least one estimated value of the torque transmitted through the said clutch, on the basis of the said reaction signal and a transmissibility function of the said clutch;

generating a control signal for adjusting the position of the said actuating member of the clutch as a function of the said reference torque signal and the said estimated torque signal;

characterized in that it comprises an additional stage of periodically updating the said transmissibility function of the clutch so as to adapt it to the variations, over time, of the mechanical characteristics of the clutch itself.

According to the present invention a device for controlling the clutch of a vehicle is also provided, comprising:

signal generating means receiving at their input a plurality of information signals and generating at their output a reference torque signal representing at least one desired value of the torque transmitted through the said clutch;

position detecting means coupled to the said clutch and generating at their output a reaction signal correlated to the position of an actuating member of the said clutch, the said position of the actuating member being comprised between a first end-of-travel position in which said clutch is completely open and a second end-of-travel position in which said clutch is completely closed;

means for memorising a transmissibility function of the said clutch, receiving at their input said reaction signal and generating at their output, on the basis of the said reaction signal and the said memorized transmissibility function, an estimated torque signal representing at least one estimated value of the torque transmitted through the said clutch;

control means receiving at their input said reference torque signal and said estimated torque signal and generating at their output a control signal for adjusting the position of the said actuating member of the clutch;

characterized in that it comprises moreover:

updating means designed to update periodically the said transmissibility function of the clutch so as to adapt it to the variations, over time, of the mechanical characteristics of the clutch itself.

BRIEF DESCRIPTION OF THE DRAWINGS

In order that the present invention may be more fully understood, a preferred embodiment is now described, purely by way of a non-limiting example, with reference to the accompanying drawings, in which.

DETAILED DESCRIPTION OF THE INVENTION

Figure 1:
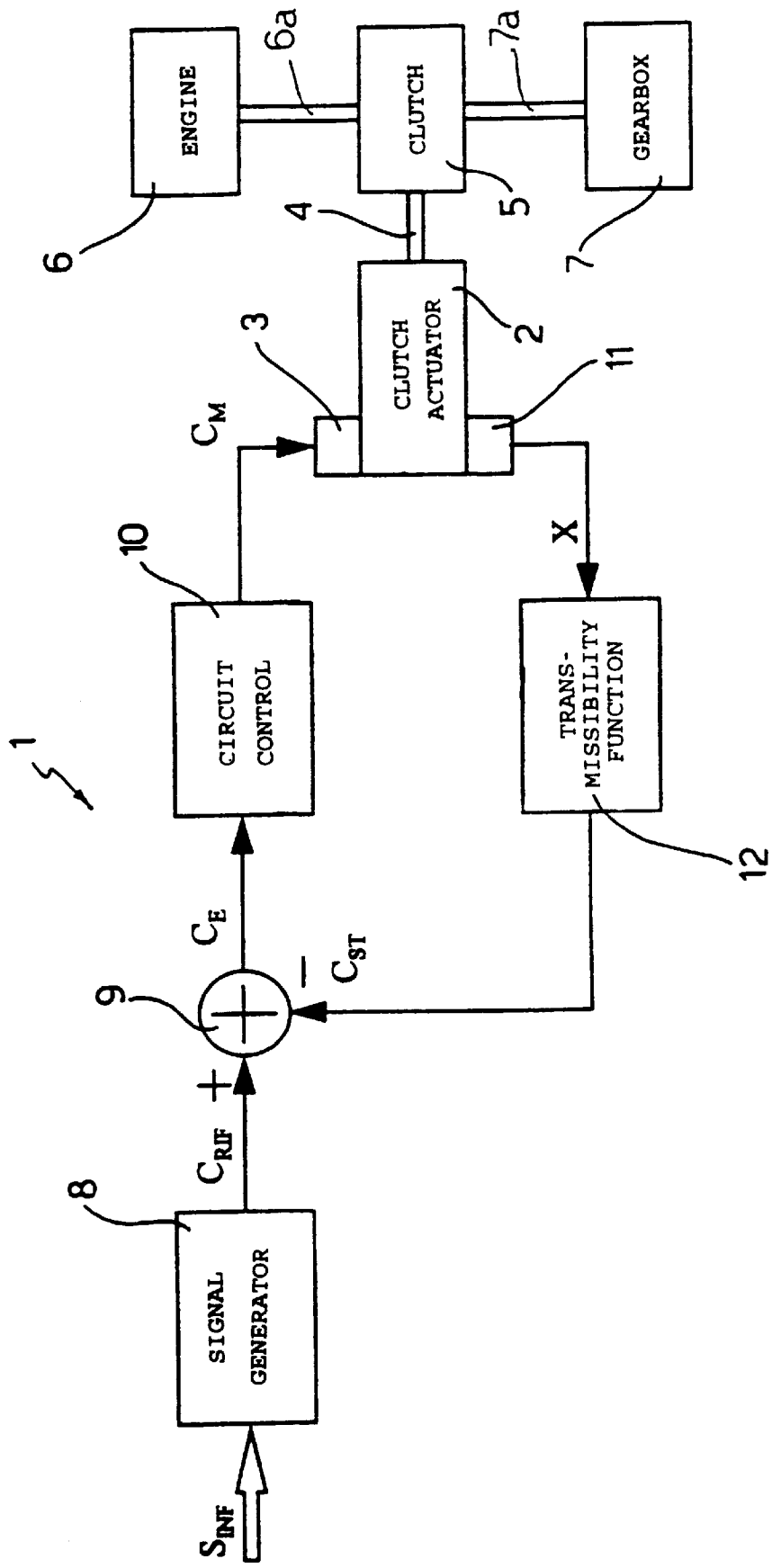
FIG. 1 is a block diagram of a device for controlling a clutch of the known type.
Figure 2:
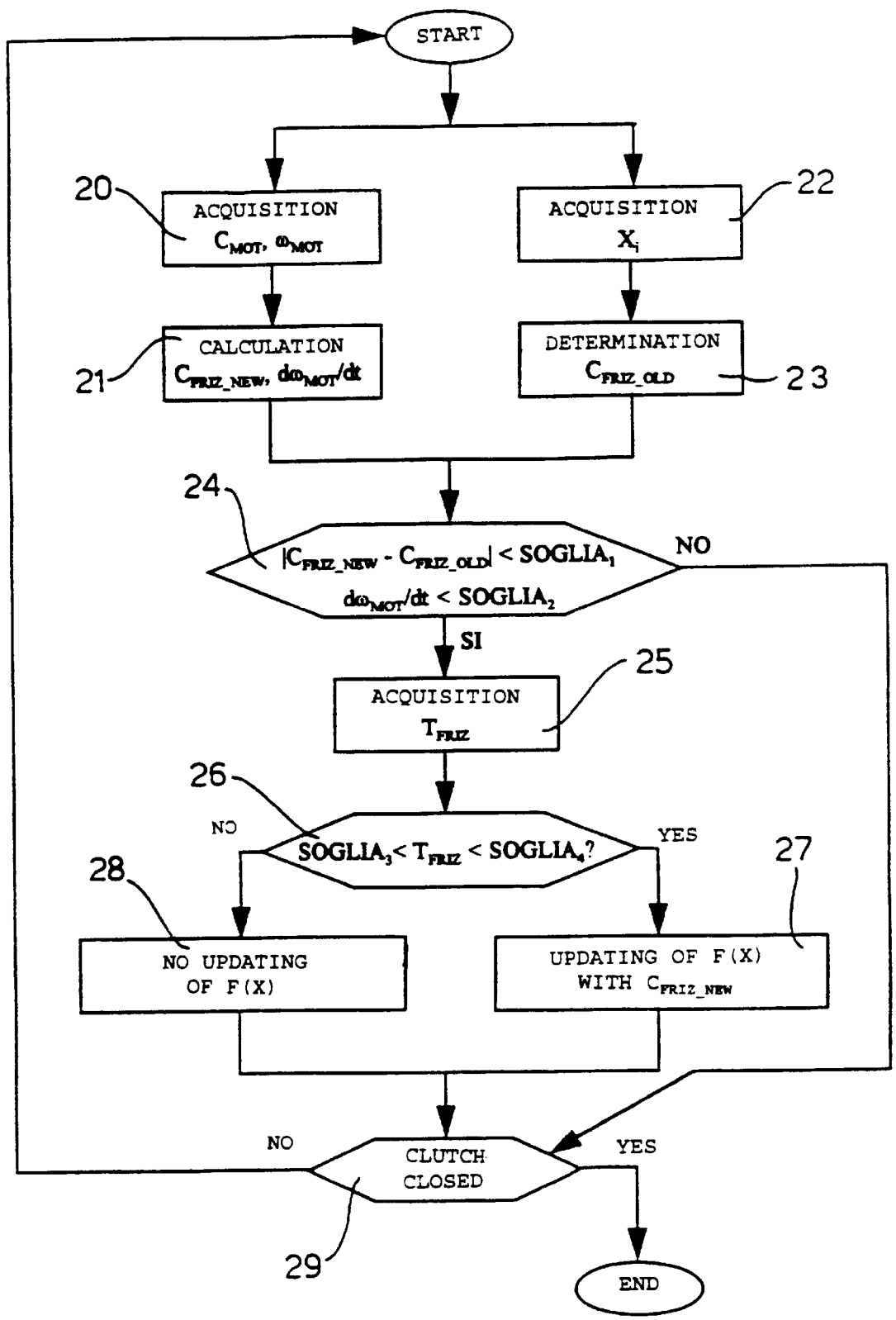
FIG. 2 is a flow diagram relating to the method according to the present invention.

The present invention is based on the principle of periodically updating the transmissibility function F(X) of the clutch 5 stored in the memory 12 (FIG. 1) and in particular updating it at each acceleration manoeuvre of the vehicle, by performing a series of operations illustrated in detail in the flow diagram according to FIG. 2 and implemented by a gearbox control unit (not shown).

In particular, in order to detect that the vehicle is performing an acceleration manoeuvre, namely a manoeuvre involving gradual closing, with the vehicle at a standstill, of the clutch 5 in order to raise the number of revolutions of the input shaft 7a of the gearbox 7 so as to be substantially equal to the number of revolutions of the output shaft 6a of the engine 6, the logic status (0 or 1) of a logic flag stored in the gearbox control unit is read and updated by the control unit itself during normal operation of the vehicle.

During the acceleration manoeuvre of the vehicle, the actuating lever 4 of the clutch 5 assumes a plurality of adjacent positions comprised between a first end-of-travel position in which the clutch 5 is completely open, and a second end-of-travel position in which the clutch 5 is completely closed. For each of the intermediate positions comprised between the first and the second end-of-travel position, the operations illustrated in the flow diagram of FIG. 2 are repeated so as to update the transmissibility function F(X) at that particular position of the actuating lever 4 of the clutch 5.

The operations according to FIG. 2 start when the actuating lever 4 of the clutch 5 is arranged, during the vehicle acceleration manoeuvre, in the first end-of-travel position where the clutch 5 is completely open.

In this position, two series of operations represented by the steps 20, 21 and 22, 23 are performed in parallel.

In step 20 an effective value $C_{MOT}$ of the torque produced by the engine 6 and an effective value $\omega_{MOT}$ of the angular velocity of the engine 6 itself are acquired; in particular, the effective values $C_{MOT}$ and $\omega_{MOT}$ of the torque produced by the engine 6 and its angular velocity are generally provided by the engine control unit (not shown) which, for each particular instant, detects the instantaneous value thereof.

From step 20 one passes to step 21 where, on the basis of the effective value $\omega_{MOT}$, a value $d\omega_{MOT}/dt$ of the angular acceleration of the engine 6 and, on the basis of the effective value $C_{MOT}$ and the value $d\omega_{MOT}/dt$, an estimated value $C_{FRIZ\_NEW}$ of the torque transmitted through the clutch 5 are calculated.

In particular, the calculation of the estimated value $C_{FRIZ\_NEW}$ of the torque transmitted through the clutch 5 is performed using the following equation of dynamic equilibrium:

$$C_{FRIZ\_NEW} = C_{MOT} - J_{MOT} \cdot \frac{d\bar{\omega}_{MOT}}{dt} \qquad 1)$$

where $J_{MOT}$ is the moment of inertia of the engine 6.

At the same time as the operations described in steps 20, 21, the operations illustrated in steps 22, 23 are performed.

In particular, in step 22 the instantaneous value $x_i$ of the reaction signal X generated by the position sensor 11 and the relating to the position assumed by the actuating lever 4 of the clutch 5 is acquired.

From step 22 one passes to step 23 where the instantaneous value $C_{FRIZ\_OLD}$ of the estimated torque signal $C_{ST}$ generated at the output of the memory 12 on the basis of the instantaneous value $x_i$ of the incoming signal X is detected.

From steps 21, 23 one passes to step 24 where the absolute value of the difference between the estimated value $C_{FRIZ\_NEW}$ of the torque transmitted through the clutch 5 and the instantaneous value $C_{FRIZ\_OLD}$ detected, is calculated; the absolute value of this difference is moreover compared with a predetermined threshold value Soglia1.

In step 24 the value $d\omega_{MOT}/dt$ of the angular acceleration of the engine 6 calculated previously is also detected and this value is compared with a predetermined threshold value Soglia2.

In particular, in step 24 the following comparisons are performed:

$$|C_{FRIZ\_NEW} - C_{FRIZ\_OLD}| < Soglia1 \qquad 2)$$

$$\frac{d\omega_{MOT}}{dt} < Soglia2$$

The comparisons performed with the in equations 2) enable the reliability of the estimated value $C_{FRIZ\_NEW}$ calculated by means of the equation 1) to be verified. In particular, the unreliability of the estimated value $C_{FRIZ\_NEW}$ is detected, if the latter differs excessively from the instantaneous value $C_{FRIZ\_OLD}$ determined on the basis of the transmissibility function F(X) or if the value $d\omega_{MOT}/dt$ is greater than the associated threshold value since, in this case, the term $J_{MOT} \cdot d\omega_{MOT}/dt$ in the equation 1) prevails over the term $C_{MOT}$ and the estimate provided by 1) is no longer reliable.

If the difference between the values $C_{FRIZ\_NEW}$ and $C_{FRIZ\_OLD}$ is less, in terms of absolute value, than the associated threshold value and the acceleration of the engine 6 is less than the associated threshold value (option YES of step 24), the reliability of the estimated value $C_{FRIZ\_NEW}$ is detected and one passes to step 25, otherwise (option NO of step 24) the unreliability of the estimated value $C_{FRIZ\_NEW}$ is detected and therefore no updating of the transmissibility function F(X) is performed; in this case, the step 24 is followed by a step 29 described below.

In step 25, the value $T_{FRIZ}$ of the temperature of the clutch 5 is acquired, said value being generally estimated on the basis of a known temperature model of the clutch 5.

Step 25 is followed by step 26 where it is verified whether the value $T_{FRIZ}$ of the temperature of the clutch 5 is comprised within a predetermined range of values, the lower and upper limits of which are defined by respective predetermined threshold temperature values Soglia3 and Soglia4; in step 25 it is therefore verified whether:

$$Soglia3 < T_{FRIZ} < Soglia4 \qquad 3)$$

The comparison performed in the inequation 3) enables a condition of excessive overheating or excessive cooling of the clutch 5 to be detected in the case where the value $T_{FRIZ}$ of the temperature of the clutch 5 should not satisfy the inequation 3.

In fact, if the clutch 5 is excessively overheated (for example owing to excessive use) or excessively cooled (for example when the temperature of the gearbox 7 is very low), the estimated value $C_{FRIZ\_NEW}$ calculated in step 21 is valid solely for these operational conditions, but is unreliable during operation of the clutch 5 at the normal operating temperatures.

Therefore, in the case where the clutch 5 is excessively overheated or excessively cooled (option NO of step 26), step 26 is followed by a step 28 where no updating of the transmissibility function F(X) is performed, otherwise (option YES of step 26) the step 26 is followed by a step 27 which performs updating of the transmissibility function F(X).

In step 27 the transmissibility function F(X) of the clutch 5 is updated with the estimated value $C_{FRIZ\_NEW}$ of transmitted torque, calculated with the equation 1).

In particular, updating of the transmissibility function F(X) involves modifying the one-to-one relation defined by the transmissibility function F(X) at a point corresponding to the instantaneous value $x_i$ assumed by the reaction signal X in the considered position of the actuating lever 4 of the clutch 5.

In detail, modification of the one-to-one relation is performed by replacing, in the table memorised in the memory 12, the instantaneous value $C_{FRIZ\_OLD}$ associated with the instantaneous value $x_i$ assumed in that moment by the reaction signal X, with the estimated value $C_{FRIZ\_NEW}$ of transmitted torque calculated with the equation 1) by step 21.

Moreover, the estimated value $C_{FRIZ\_NEW}$ is used by the control device 1 of FIG. 1 to perform adjustment of the position of the actuating lever 4 of the clutch 5.

In step 28, on the other hand, the transmissibility function F(X) of the clutch 5 memorised in the memory 12 is not updated with the estimated value $C_{FRIZ\_NEW}$ calculated with the equation 1), but this value is used nevertheless by the control device of FIG. 1 to perform adjustment of the position of the actuating lever 4 of the clutch 5.

From steps 27, 28 one passes to step 29 where it is verified whether the actuating lever 4 of the clutch 5 has reached the second end-of-travel position, namely whether the clutch 5 is completely closed.

When the clutch 5 is completely closed (option YES of block 29), the acceleration manoeuvre of the vehicle is terminated and the operations of updating of the transmissibility function F(X) of the clutch 5 are terminated and will recommence with those described in connection with steps 20, 21 at the next acceleration manoeuvre performed by the vehicle; if, on the other hand, the clutch 5 is not completely closed (option NO of step 29), then the acceleration manoeuvres of the vehicle are not yet terminated and the operations of updating of the transmissibility function F(X) of the clutch 5 recommence with those described in connection with steps 20, 21.

From the description above it is clear how the method described allows periodic updating of the transmissibility function F(X) of the clutch 5 so as to take account of variations, over time, in the mechanical characteristics of the clutch 5 itself, which inevitably occur during the life of the clutch 5 on account of variations in the operating temperature and inevitable wear-related phenomena.

Owing to this updating feature, therefore, even when the mechanical characteristics of the clutch 5 change, it is possible to optimise the performance of the vehicle during the gear-changing and acceleration manoeuvres and obtain a comfortable travel progression of the vehicle.

Moreover, the present method is simple, easy to implement and does not require modifications to the control device 1 of the clutch 5 or the availability of dedicated devices, since the operations required may be performed directly by the control unit controlling the gearbox.

Finally, it is obvious that modifications and variations may be made to the method described and illustrated herein without thereby departing from the protective scope of the present invention.

For example, the operations of updating of the transmissibility function F(X) of the clutch 5 memorised in the memory 12 could be performed not necessarily at each acceleration manoeuvre of the vehicle, but also, for example, periodically during general operation of the clutch 5.

Moreover, step 25, where the value $T_{FRIZ}$ of the temperature of the clutch 5 is acquired, could be arrived at after performing checks different from those described in step 24.

In particular, step 24 could perform solely the comparison of the difference between the estimated and memorised values $C_{FRIZ\_NEW}$ and $C_{FRIZ\_OLD}$ and the respective threshold value, without any additional and/or simultaneous verification.

Moreover, in the case where the clutch 5 is excessively overheated or excessively cooled, namely the temperature $T_{FRIZ}$ of the clutch 5 does not satisfy the inequation 3), operations different from those described in step 28 could be performed.

For example, the control device 1 of FIG. 1, in order to perform adjustment of the position of the actuating lever 4 of the clutch 5, could use, instead of the estimated value $C_{FRIZ\_NEW}$ calculated with the equation 1), the corresponding instantaneous value $C_{FRIZ\_OLD}$ memorised in the memory 12 and corrected in accordance with a predetermined law which correlates the torque transmitted to the drive wheels with the value $T_{FRIZ}$ of the operating temperature of the clutch 5, and in particular corrected on the basis of a parameter K which is also memorised in the memory 12 and the dependency of which on the temperature $T_{FRIZ}$ is determined experimentally during laboratory tests.

Finally, step 27, where the transmissibility function F(X) of the clutch 5 is updated, could be arrived at directly from step 24 (option YES) without performing the operations described in steps 25 and 26, i.e. without performing detection of the value $T_{FRIZ}$ of the operating temperature of the clutch 5 and consequent comparison with the associated threshold values Soglia3 and Soglia4 for determining whether the clutch 5 is excessively overheated or excessively cooled.

What is claimed is:

1. In a method for controlling the clutch of an engine driven vehicle comprising the steps of:

generating a reference torque signal ($C_{RIF}$) representing at least one desired value of the torque transmitted by the engine through the said clutch (5);

generating a reaction signal (X) correlated to the position of an actuating member (4) of the clutch (5), the position of the actuating member (4) being located between a first end-of-travel position in which the clutch (5) is completely open and a second end-of-travel position in which the clutch (5) is completely closed;

generating an estimated torque signal ($C_{ST}$) representing at least one estimated value of the torque transmitted through the clutch (5), on the basis of the reaction signal (X) and a transmissibility function (F(X)) of the clutch (5);

generating a control signal ($C_M$) for adjusting the position of the actuating member (4) of the clutch (5) as a function of the reference torque signal ($C_{RIF}$) and the estimated torque signal ($C_{ST}$);

the improvement comprising the step of periodically updating the transmissibility function (F(X)) of the clutch (5) as a function of the torque and angular speed of said engine thereby adapting said function (F(X)) to any variations, over time, of the mechanical characteristics of the clutch (5), and wherein said step of periodically updating the transmissibility function (F(X)) of the clutch (5) comprises the step of updating the transmissibility function (F(X)) itself during operation of the clutch (5), and wherein the transmissibility function (F(X)) of the clutch (5) defines a one-to-one relationship between each of the instantaneous values ($X_i$) of said reaction signal (X) and a corresponding instantaneous value ($C_{FRIZ\_OLD}$) of the estimated torque signal ($C_{ST}$).

2. The method according to claim 1, wherein the step of periodically updating the transmissibility function (F(X)) includes repeating, for each of the positions assumed by the actuating member (4) of the clutch (5) during the operation of the clutch (5) itself, the following steps:

acquiring an effective value ($C_{MOT}$) of torque produced by the engine (6) of the vehicle;

acquiring an effective value ($\overline{\omega}_{MOT}$) of angular velocity of the engine (6);

calculating an estimated value ($C_{FRIZ\_NEW}$) of torque transmitted through the clutch (5) on the basis of the effective value ($C_{MOT}$) of torque and the effective value ($\overline{\omega}_{MOT}$) of angular velocity;

determining an instantaneous value ($C_{FRIZ\_OLD}$) assumed by said estimated torque signal ($C_{ST}$) at a point corresponding to the instantaneous value ($x_i$) assumed by the reaction signal (X) in the considered position of the actuating member (4) and on the basis of the transmissibility function (F(X));

comparing the estimated value ($C_{FRIZ\_NEW}$) of torque transmitted through the clutch (5) with the instantaneous value ($C_{FRIZ\_OLD}$) assumed by the estimated torque signal ($C_{ST}$); and updating the transmissibility function (F(X)) of the clutch (5) on the basis of the estimated value ($C_{FRIZ\_NEW}$) of transmitted torque if the estimated value ($C_{FRIZ\_NEW}$) of transmitted torque has a first predetermined relationship with the instantaneous value ($C_{FRIZ\_OLD}$) assumed by the estimated torque signal ($C_{ST}$).

3. The method according to claim 2, wherein the step of updating the transmissibility function (F(X)) of the clutch (5) on the basis of the estimated value ($C_{FRIZ\_NEW}$) of transmitted torque is performed when the absolute value of the difference between the estimated value ($C_{FRIZ\_NEW}$) of transmitted torque and the instantaneous value ($C_{FRIZ\_OLD}$) assumed by the estimated torque signal is less than a first predetermined threshold value.

4. The method according to claim 2, wherein the step of updating the transmissibility function (F(X)) of the clutch (5) on the basis of the estimated value ($C_{FRIZ\_NEW}$) of transmitted torque comprises the step of modifying the one-to-one relationship at a point corresponding to the instantaneous value ($x_i$) assumed by the reaction signal (X) in the considered position of the actuating member (4).

5. The method according to claim 4, wherein the step of modifying the one-to-one relationship comprises the step of replacing the instantaneous value ($C_{FRIZ\_OLD}$) of the estimated torque signal ($C_{ST}$) associated with the instantaneous value ($x_i$) of the reaction signal (X), with the estimated value ($C_{FRIZ\_NEW}$) of torque transmitted through the clutch (5).

6. The method according to claim 2, wherein the step of calculating an estimated value ($C_{FRIZ\_NEW}$) of torque transmitted through the clutch (5) comprises the step of determining the estimated value ($C_{FRIZ\_NEW}$) of transmitted torque in accordance with the relation:

$$C_{FRIZ\_NEW} = C_{MOT} - J_{MOT} \cdot \frac{d\overline{\omega}_{MOT}}{dt}$$

where ($C_{FRIZ\_NEW}$) represents the estimated value of torque transmitted through the clutch (5), $J_{MOT}$ represents the moment of inertia of the engine (6), $C_{MOT}$ represents the effective value of torque produced by the engine (6) and $\overline{\omega}_{MOT}$ represents the effective value of the angular velocity of the engine (6) itself.

7. The method according to claim 2, which further comprises the steps of:

acquiring a temperature value ($T_{FRIZ}$) of the clutch (5) if the estimated value ($C_{FRIZ\_NW}$) of transmitted torque has said first predetermined relationship with the instantaneous value ($C_{FRIZ\_OLD}$) assumed by the estimated torque signal ($C_{ST}$);

comparing the temperature value ($T_{FRIZ}$) of the clutch (5) with at least one second predetermined threshold value; and updating the transmissibility function (F(X)) of the clutch (5) on the basis of the estimated value ($C_{FRIZ\_NEW}$) of transmitted torque if the estimated value ($C_{FRIZ\_NEW}$) of transmitted torque has said first predetermined relationship with the instantaneous value ($C_{FRIZ\_OLD}$) assumed by the estimated torque signal ($C_{ST}$) and the temperature value ($T_{FRIZ}$) has at least one second predetermined relationship with the second predetermined threshold value.

8. The method according to claim 7, wherein said step of updating the transmissibility function (F(X)) of the clutch (5) on the basis of the estimated value ($C_{FRIZ\_NEW}$) of transmitted torque is performed when the absolute value of the difference between the estimated value ($C_{FRIZ\_NEW}$) of transmitted torque and the instantaneous value ($C_{FRIZ\_OLD}$) assumed by the estimated torque signal is less than the first predetermined threshold value and the temperature value ($T_{FRIZ}$) of the clutch (5) is less than the second predetermined threshold value.

9. The method according to claim 7, which further comprises the steps of:

calculating the time derivative ($d\overline{\omega}_{MOT}/dt$) of the effective value ($\overline{\omega}_{MOT}$) of the angular velocity;

comparing the time derivative ($d\overline{\omega}_{MOT}/dt$) with a third predetermined threshold value;

and wherein the step of comparing the time derivative ($d\overline{\omega}_{MOT}/dt$) is performed in combination with the step of comparing the estimated value ($C_{FRIZ\_NEW}$) of transmitted torque with the instantaneous value ($C_{FRIZ\_OLD}$) assumed by the estimated torque signal ($C_{ST}$).

10. The method according to claim 9, wherein the step of updating the transmissibility function (F(X)) of the clutch (5) on the basis of the estimated value ($C_{FRIZ\_NEW}$) of transmitted torque is performed when the estimated value ($C_{FRIZ\_NEW}$) of transmitted torque has said first predetermined relationship with the instantaneous value ($C_{FRIZ\_OLD}$) assumed by the estimated torque signal ($C_{ST}$), the temperature value ($T_{FRIZ}$) has at least the second predetermined relationship with the second predetermined threshold value, and the time derivative ($d\overline{\omega}_{MOT}/dt$) has a third predetermined relationship with the third predetermined threshold value.

11. The method according to claim 10, wherein the step of updating the transmissibility function (F(X)) of the clutch (5) on the basis of the estimated value ($C_{FRIZ\_NEW}$) of transmitted torque is performed when the absolute value of the difference between the estimated value ($C_{FRIZ\_NEW}$) of transmitted torque and the instantaneous value ($C_{FRIZ\_OLD}$) assumed by the estimated torque signal is less than the first predetermined threshold value, the temperature value ($T_{FRIZ}$) of the clutch (5) is less than the second predetermined threshold value, and the time derivative ($d\overline{\omega}_{MOT}/dt$) is less than the third predetermined threshold value.

12. The method according to claim 1, wherein the step of updating the transmissibility function (F(X)) during operation of the clutch (5) comprises the step of updating the transmissibility function (F(X)) itself during an acceleration maneuver of the vehicle.

13. In a device for controlling the clutch of an engine driven vehicle, comprising:

signal generating means (8) for receiving at their input a plurality of information signals ($S_{INF}$) and for generating at their output a reference torque signal ($C_{RIF}$) representing at least one desired value of the torque transmitted through the clutch (5);

position detecting means (11) coupled to the said clutch (5) for generating at their output a reaction signal (X) correlated to the position of an actuating member (4) of the said clutch (5), the said position of the actuating member (4) being located between a first end-of-travel position in which the clutch (5) is completely open and a second end-of-travel position in which the clutch (5) is completely closed;

storage means (12) for storing in memory a transmissibility function (F(X)) of the clutch (5) for receiving at their input said reaction signal (X) and for generating at their output, on the basis of the reaction signal (X) and the stored transmissibility function (F(X)), an estimated torque signal ($C_{ST}$) representing at least one estimated value of the torque transmitted through the clutch (5);

control means (9, 10) for receiving at their input said reference torque signal and said estimated torque signal ($C_{RIF}$) and for generating at their output a control signal ($C_M$) for adjusting the position of the said actuating member (4) of the clutch (5); the improvement comprising:

means (20–29) for updating the transmissibility function (F(X)) of the clutch (5) as a function of the torque and angular speed of said engine thereby to adapt it to any variations, over time, of the mechanical characteristics of the clutch (5) itself, and wherein the updating means (20-29) update said transmissibility function (F(X)) during operation of the clutch (5), and wherein the storage means (12) include a table comprising the transmissibility function (F(X)); the transmissibility function (F(X)) defining a one-to-one relationship between each of the instantaneous values ($X_i$) of the reaction signal (X) and a corresponding instantaneous value ($C_{FRIZ\_OLD}$) of the estimated torque signal ($C_{ST}$).

14. The device according to claim 13, wherein the updating means (20–29) include means (29) for cyclically repeating, said updating of said transmissibility function (F(X)) for each of the positions assumed by the actuating member (4) of the clutch (5) during the operation of the clutch (5); said updating means further including:

first means (20) for acquiring an effective value ($C_{MOT}$) of torque produced by the engine (6) of the vehicle;

second means (20) for acquiring an effective value ($\overline{\omega}_{MOT}$) of angular velocity of the engine (6);

first calculating means (21) for determining an estimated value ($C_{FRIZ\_NEW}$) of torque transmitted through the clutch (5) on the basis of the effective value ($C_{MOT}$) of torque produced by the engine (6) and the effective value ($\overline{\omega}_{MOT}$) of angular velocity of the engine (6);

second calculating means (23) for determining an instantaneous value ($C_{FRIZ\_OLD}$) assumed by the estimated torque signal ($C_{ST}$) at a point corresponding to the instantaneous value ($x_i$) assumed by the reaction signal (X) in the considered position of the actuating member (4) and on the basis of the transmissibility function (F(X));

first comparator means (24) for comparing the estimated value ($C_{FRIZ\_NEW}$) of torque transmitted by the clutch (5) with the instantaneous value ($C_{FRIZ\_OLD}$) assumed by the estimated torque signal ($C_{ST}$); and means (27) actuated by said first comparator means (24) for reviewing the transmissibility function (F(X)) of the clutch (5), and thereafter updating the transmissibility function (F(X)) on the basis of the estimated value ($C_{FRIZ\_NEW}$) of torque transmitted when the estimated value ($C_{FRIZ\_NEW}$) of transmitted torque has a first predetermined relationship with the instantaneous value ($C_{FRIZ\_OLD}$) assumed by the estimated torque signal ($C_{ST}$).

15. The device according to claim 14, wherein the first comparator means (24) are also for actuating the reviewing means (27) when the absolute value of the difference between the estimated value ($C_{FRIZ\_NEW}$) of transmitted torque and the instantaneous value ($C_{FRIZ\_OLD}$) assumed by the estimated torque signal ($C_{ST}$) is less than a first predetermined threshold value.

16. The device according to claim 14, wherein the reviewing means include correction means (27) for modifying the one-to-one relationship defined by the transmissibility function (F(X)) at a point corresponding to the instantaneous value ($x_i$) assumed by the reaction signal (X) in the considered position of the actuating member (4).

17. The device according to claim 16, wherein the correction means include replacement means (27) for replacing the instantaneous value ($C_{FRIZ\_OLD}$) of the estimated torque signal ($C_{ST}$) associated with the instantaneous value ($x_i$) of the reaction signal (X), with the estimated value ($C_{FRIZ\_NEW}$) of torque transmitted through the clutch (5).

18. The device according to claim 14, wherein the first calculating means (21) operates in accordance with the relation:

$$C_{FRIZ\_NEW} = C_{MOT} - J_{MOT} \cdot \frac{d\bar{\omega}_{MOT}}{dt}$$

where ($C_{FRIZ\_NEW}$) represents the estimated value of torque transmitted through the clutch (5), $J_{MOT}$ represents the moment of inertia of the engine (6), $C_{MOT}$ represents the effective value of torque produced by the engine (6) and $\bar{\omega}_{MOT}$ represents the effective value of the angular velocity of the engine (6) itself.

19. The device according to claim 14, wherein said device further includes:

third means (25) actuated by the first comparator means (24) for acquiring a temperature value ($T_{FRIZ}$) of the clutch (5) when the estimated value ($C_{FRIZ\_NEW}$) of transmitted torque has said first predetermined relationship with the instantaneous value ($C_{FRIZ\_OLD}$) assumed by the estimated torque signal ($C_{ST}$); and second comparator means (26) for comparing the temperature value ($T_{FRIZ}$) of the clutch (5) with at least one second predetermined threshold value;

the means (27) for reviewing the transmissibility function (F(X)) of the clutch (5) being actuated by said second comparator means (26) when the estimated value ($C_{FRIZ\_NEW}$) of transmitted torque has said first predetermined relationship with the instantaneous value ($C_{FRIZ\_OLD}$) assumed by the estimated torque signal ($C_{ST}$) and the temperature value ($T_{FRIZ}$) has a second predetermined relationship with the second predetermined threshold value.

20. The device according to claim 19, wherein said reviewing means (27) are actuated by the first and second comparator means (24, 26) when the absolute value of the difference between the estimated value ($C_{FRIZ\_NEW}$) of transmitted torque and the instantaneous value ($C_{FRIZ\_OLD}$) assumed by the estimated torque signal ($C_{ST}$) is less than said first predetermined threshold value and the temperature value ($T_{FRIZ}$) of the clutch (5) is at least less than the second predetermined threshold value.

21. The device according to claim 19, which further comprises:

means (21) for calculating a time derivative ($d\bar{\omega}_{MOT}/dt$) of the effective value ($\bar{\omega}_{MOT}$) of the angular velocity of the said engine (6); and third comparator means (24) operating in combination with the said first comparator means (24), for comparing the time derivative ($d\bar{\omega}_{MOT}/dt$) with a third predetermined threshold value.

22. The device according to claim 21, wherein the means (27) for reviewing the transmissibility function (F(X)) of the clutch (5) are actuated by the first, second and third comparator means (24, 26) when the estimated value ($C_{FRIZ\_NEW}$) of transmitted torque has said first predetermined relationship with the instantaneous value ($C_{FRIZ\_OLD}$) assumed by the estimated torque signal ($C_{ST}$), the temperature value ($T_{FRIZ}$) has said second predetermined relationship with said second predetermined threshold value, and the time derivative ($d\bar{\omega}_{MOT}/dt$) has a third predetermined relationship with said third predetermined threshold value.

23. The device according to claim 22, wherein the means (27) for reviewing the transmissibility function (F(X)) of the clutch (5) are actuated by the first, second and third comparator means (24, 26) when the absolute value of the difference between the estimated value ($C_{FRIZ\_NEW}$) of transmitted torque and the instantaneous value ($C_{FRIZ\_OLD}$) assumed by the estimated torque signal ($C_{ST}$) is less than the first predetermined threshold value, the temperature value ($T_{FRIZ}$) of the clutch (5) is at least less than the second predetermined threshold value, and the time derivative (d$\bar{\omega}_{MOT}/dt$) is less than the third predetermined threshold value.

24. The device according to claim 13, wherein the updating means (20–29) update the said transmissibility function (F(X)) during an acceleration maneuver of the vehicle.

* * * * *